Patented July 15, 1924.

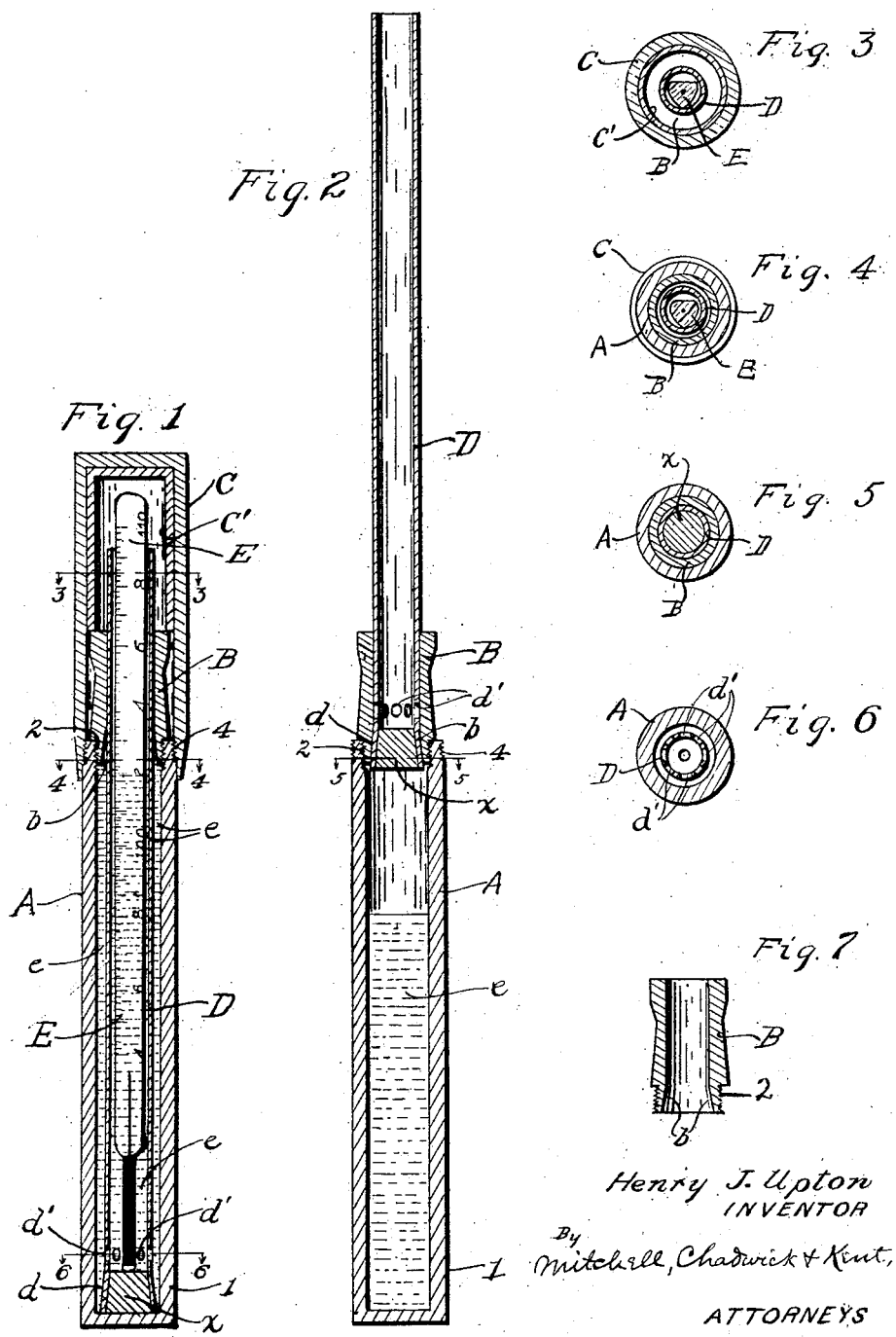

1,501,824

UNITED STATES PATENT OFFICE.

HENRY J. UPTON, OF MEDFORD, MASSACHUSETTS, ASSIGNOR TO VAUGHN-UPTON COMPANY, OF BOSTON, MASSACHUSETTS, A CORPORATION OF MASSACHUSETTS.

THERMOMETER CASE.

Application filed November 6, 1923. Serial No. 673,180.

*To all whom it may concern:*

Be it known that I, HENRY J. UPTON, a citizen of the United States, residing at Medford, in the county of Middlesex and State of Massachusetts, have invented certain new and useful Improvements in Thermometer Cases, of which the following is a specification.

My invention is a sterilizing holder or case for a clinical thermometer, in which, while the thermometer is being carried in the case it is immersed in a sterilizing liquid, which, when the thermometer is withdrawn for use, is confined in the case by means of a sealing member which closes the mouth of the case, so that the thermometer may be laid down upon a table or the like, without spilling the sterilizing liquid.

In the drawings:

Figure 1 is a central longitudinal section of the case, with the thermometer in place;

Figure 2 is a central longitudinal section of the case with the thermometer removed and the sealing element in operative position;

Figures 3, 4 and 6 are cross sections on lines 3—3, 4—4 and 6—6, of Figure 1; and Figure 5 is a cross section on line 5—5 of Figure 2.

Figure 7 is a detached view, in section, of part B.

My case or holder, A, is formed as a tube, one end, 1, closed and the other end provided on its inner surface with screw threads, 2, to cooperate with screw threads, 2, on the exterior of the rear end of a valve-section, B, which is screwed into the open end of casing A. A cap C, c', of well known type, is also provided, engaging the outside of the casing by means of screw threads, 4, to cover and protect the end of the thermometer and seal the casing, when it is being carried in the pocket.

Within the holder A, and fitting closely and sliding within the outer end of section B is a cylinder D, closed at its inner end by a plug or otherwise, and open at the other end. The inner end of section B is slightly coned, as at b, and the inner end of cylinder D is slightly coned, as at, d. Above the plug X are a series of perforations, d', through the walls of cylinder D.

The operation is as follows: Before the thermometer, E, is inserted, as in Figure 1, the case is partly filled with a sterilizing liquid, e, which being poured into the open end of cylinder D, passes through perforations d' into holder or casing A. The thermometer being inserted, the liquid rises within the holder and surrounds the portion of the thermometer contained in the holder. When it is desired to use the thermometer, the cylinder D is drawn upward (see Figure 2) the liquid within the cylinder flowing out through perforations d' into case A. At the end of the stroke the perforations will pass within section B and the conical surface, d, of cylinder D will engage the conical surface, b, of section B, stopping cylinder D and closing holder A. The thermometer may now be removed and the holder A D laid down anywhere. The thermometer is later replaced in cylinder D which is allowed to re-enter case A, the liquid passing through perforations d' into cylinder D. The cap C is screwed on and the holder A, and its contents, may then be carried in the pocket.

I claim:

1. The holder above described, made up of an outer case closed at one end, a valve seat at the open end of the outer case; an inner cylinder slidably mounted within the outer case, closed at its inner end, and having a valve seat on the outer surface of the inner end and a perforation through its walls adjacent the valve seat, all combined and operating substantially as described.

2. The holder above described, made up of an outer case closed at one end; a valve member mounted in the open end of the case and having an interior conical seat; an inner cylinder slidably mounted within the outer case, closed at its inner end and having a conical valve seat on its outer surface at the inner end and a perforation through its wall adjacent to the valve seat, all combined and operating substantially as described.

3. As in claim 1, with a cap to cover and close the open end of the case.

Signed at Boston, Massachusetts, this 5th day of November, 1923.

HENRY J. UPTON,